Aug. 4, 1936. W. V. JOHNSON 2,049,908
MINE CAR WHEEL
Filed Feb. 2, 1935
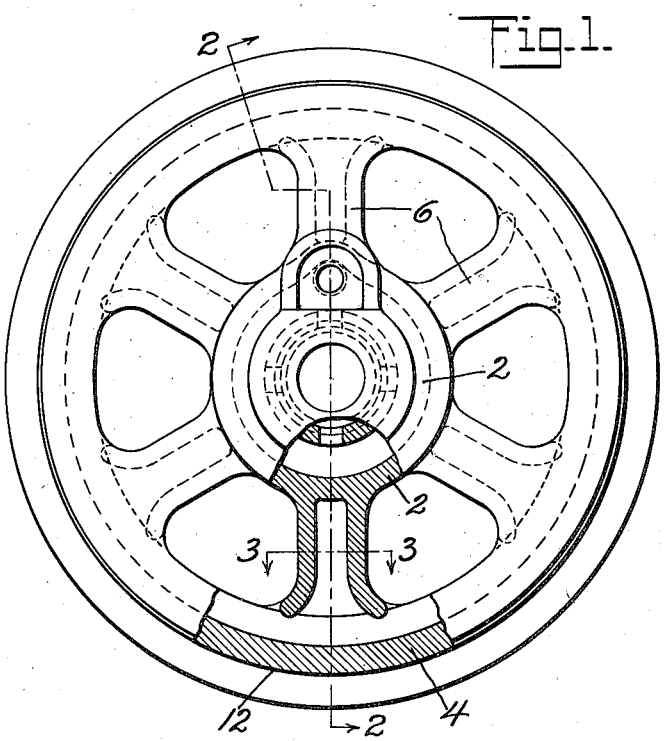
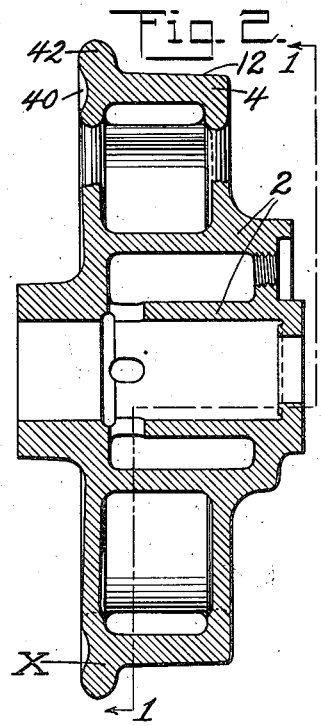
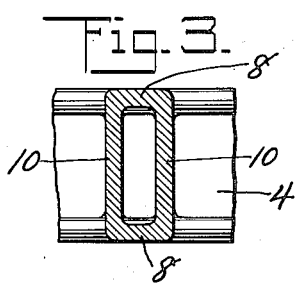
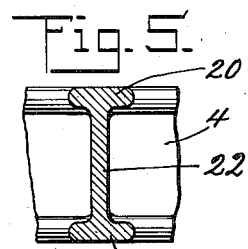
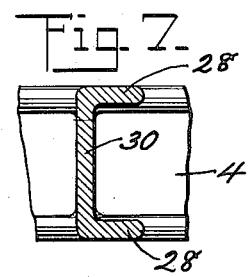
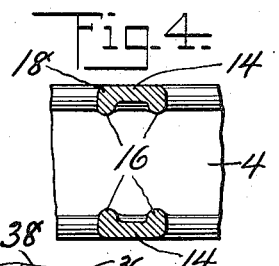
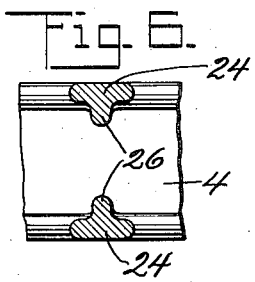
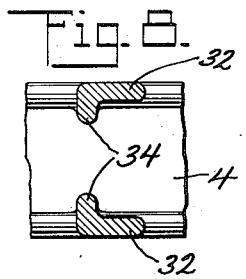
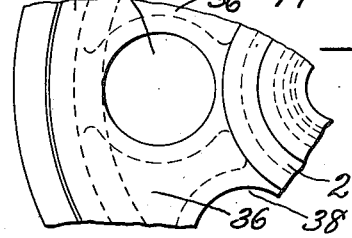
INVENTOR
Warren V. Johnson
BY Donald U. Rich
ATTORNEY Patented Aug. 4, 1936

2,049,908

UNITED STATES PATENT OFFICE 2,049,908

MINE CAR WHEEL

Warren V. Johnson, Bloomsburg, Pa., assignor to American Car and Foundry Company, New York, N. Y., a corporation of New Jersey Application February 2, 1935, Serial No. 4,615

9 Claims. (Cl. 295—26)

This invention relates to railway car wheels and has particular reference to cast wheels for use primarily with mine and industrial cars.

Modern mine practice has resulted in greatly decreasing the life of mine car spoke wheels, it being noted that the majority of wheels, after extensive service, develop flat spots in the tread of the wheel diametrically outward of the wheel spokes. This obviously indicates that the wheels are less durable at these points than at others. It has been found that in casting the usual type of mine car spoke wheel the spokes act as a feeder from the hub of the wheel to the felly and this results in the formation of a felly or tread portion which is not of homogeneous character and, in fact, the construction is one in which the depth of chill is not uniform resulting, after the wheel becomes worn, in alternate hard and soft spots.

It is advisable and necessary to provide a mine car wheel in which the rail contacting portion of the felly or tread is of uniform hardness and depth of chill throughout and the present invention has for one object the provision of such a wheel.

Another object of this invention is the provision of a spoke wheel in which the spokes are connected to and extend between the side edge portions of the felly and the hub whereby the rail contacting portion of the tread is not connected directly with the hub with the result that a tread portion of substantially uniform hardness and depth of chill is provided.

A still further object of this invention is the provision of a wheel in which the felly receives a chill of uniform depth over its entire area in order that the felly as it wears down will present surfaces of uniform hardness.

Other objects and advantages of this invention will be apparent from the following description taken in conjunction with the accompanying drawing in which:

Figure 1 is a front elevation, partly in section, of a wheel showing one form of the invention, the view being taken on the line 1—1, Fig. 2.

Fig. 2 is a sectional view on the line 2—2, Fig. 1.

Fig. 3 is a sectional view taken on the line 3—3, Fig. 1.

Figs. 4 to 8 inclusive are sectional views through spokes of a wheel showing, respectively, modifications of the construction shown in Figs. 1 to 3 inclusive, and Fig. 9 is a fragmentary front view of a still further modified form of the invention.

Referring now more particularly to the drawing in which similar characters of reference designate similar parts in the several views, the wheel of the present invention comprises a hub indicated generally at 2 and a felly 4 connected to the hub by spokes indicated generally at 6.

In the form of the invention shown in Figs. 1, 2, and 3, the spokes 6 are substantially of box section, the end walls 8 of which extend from the hub 2 and are connected with the side edge portions of the felly 4 while the side walls 10 of these box girder spokes terminate short of the rail contacting portion 12 of the felly 4. The spokes or members 6 may also be more properly termed as formed of pairs of spokes 8 joined by members 10 which terminate short of the felly. A construction in which the rail bearing portion is free from direct connection with the hub is thus provided whereby, when cast, a substantially uniform chill of said rail bearing portion is obtained.

In a wheel constructed in accordance with Fig. 4 a plurality of pairs of spokes are provided which radiate from the hub to the felly. In this form of the invention the spokes are each substantially channel-shaped in form having a web 14 and side stiffening flanges 16, these spokes indicated generally at 18 extending from the hub 2 to the side edge portions of the felly 4. This form is almost identical with that shown in Figures 1 to 3 inclusive with the exception that the connecting portion between the pairs of spokes is removed.

Fig. 5 shows a form of spoke which is substantially of I-beam cross section having oppositely arranged flanges 20 and a web 22. In this form of the invention the flanges 20 are continuous from the hub 2 of the wheel to the side edge portions of the felly while the web 22 terminates short of the rail contacting portion 12 of the felly to eliminate any direct connection between the hub and the rail contacting portion.

The construction shown in Fig. 6 follows out quite closely that in Fig. 5 with the exception that the central portion of the web 22 of the I-beam is removed whereby to provide oppositely arranged independent spoke members which are substantially I-shaped in section having a head 24 and a leg portion 26. In forming a wheel in accordance with the disclosure in Fig. 6 each of the spokes, including the leg portions 26, will extend for connection from the hub to the side edge portions of the felly 4.

Fig. 7 shows a further modification in which the spokes of the wheel of the present invention are substantially channel-shaped in section, the flanges 28 of said channels which may be termed pairs of spokes extending between and being connected with the hub 2 and side edge portions of the felly 4 while the webs or connecting portions 30 of said spokes will terminate short of the rail contacting portion 12 of the felly in a manner similar to that shown in Fig. 2 and previously described with reference to each of the figures of the drawing.

Fig. 8 shows a still further modification of the invention in which a plurality of pairs of spokes radiate from the hub to the felly and each thereof is substantially angle-shaped in section having long and short flanges 32 and 34 respectively which extend from the hub 2 to the felly 4.

Fig. 9 shows a fragmentary view of what may be termed a plate wheel in which oppositely arranged plates 36 extend from the hub to the side edge portions of the felly 4 and are provided with a plurality of reinforced openings 38 which divide the plates 36 into what may be termed a plurality of independent spoke members or pairs of spokes; the opening 38 being provided to permit spragging of the wheels in service.

The felly of the wheel is provided with a groove 40 formed in the side of the wheel adjacent the flange 42 and so proportioned that the thickness of metal at the throat portion X of the flange is substantially the same as the thickness of the metal in the tread. The provision of the groove 40 causes the chill to be of substantially constant depth transversely of the felly with the flange almost completely chilled and the provision of the type of spokes shown causes the chill to be of substantially constant depth circumferentially of the felly. It is thus seen that the felly or tread portion receives a substantially constant depth of chill and will therefore be of uniform hardness both transversely and circumferentially of the felly or tread portion.

It is believed from the description that the construction of the wheel of the present invention will be fully apparent to those skilled in the art. It is to be understood that the drawing is for illustrative purposes only and various changes in the form and proportions of the construction may be made within the scope of the appended claims without departing from the spirit of the invention.

What is claimed is:

1. A cast railway car wheel comprising a hub, a felly, and spaced apart spokes radiating from the hub and connected only to the side edge portions of the felly, whereby the rail contacting portion of the felly is of substantially uniform homogeneity circumferentially of the wheel.

2. A cast railway car wheel comprising a hub, a felly, and spaced apart spokes radiating from the hub and connected only to the side edge portions of the felly, whereby the rail contacting portion of the felly has a substantially uniform depth of chill circumferentially of the felly.

3. A cast wheel for railway cars comprising a hub, a felly, and substantially box-section spokes connecting the hub and felly, said spokes having spaced portions connected to the side edge portions of the felly and the remaining spaced side portions terminating short of the felly whereby the rail contacting portions of the felly possess substantially uniform homogeneity circumferentially of the felly.

4. A cast railway car wheel comprising a hub, a felly, and a plurality of pairs of spaced spokes radiating from the hub to the felly and connected only to the side edge portions of the felly whereby the rail contacting portion of the felly has its depth of chill substantially uniform circumferentially of the felly.

5. A cast railway or car wheel comprising a hub, a felly, and a plurality of pairs of connected spokes radiating from the hub and having spaced portions thereof connected only to the side edge portions of the felly, and the remaining portions connecting said spaced portions being spaced from the felly whereby the rail contacting portion of the felly possesses substantially uniform homogeneity.

6. A cast railway car wheel comprising a hub, a felly, and a plurality of substantially box-section spokes radiating from the hub and having their end walls united with the felly at the side edge portions of the latter and the side walls of said spokes terminating short of the felly between its side edge portions whereby to provide a rail contacting portion having its depth of chill substantially uniform circumferentially of the felly.

7. A cast railway car wheel comprising a hub, a felly, and spokes of I-beam cross section radiating from the hub to the felly, the flanges of said spokes being connected only to the felly at the side edge portions of the latter and the webs of said spokes terminating in spaced relation to the felly whereby the rail contacting portion of the felly possesses substantially uniform homogeneity circumferentially of the felly.

8. A wheel for mine and industrial cars formed as an integral casting and comprising a hub, a felly provided with a flange, a plurality of spokes connecting the hub and felly at the flanged portion of the latter, a plurality of spokes spaced from the first-named spokes and connecting the hub with the opposite side edge portion of the felly, and means connecting said spokes and terminating short of the felly whereby the rail contacting portion of the felly has its depth of chill substantially uniform circumferentially of the felly.

9. A cast railway car wheel comprising a hub, a felly having a flange and tread portion, a groove adjacent the flange and connecting means only between said hub and side edge portions of said felly, said groove and connecting means being so positioned with respect to the felly as to insure uniform depth of chill over the entire flange and tread portions.

WARREN V. JOHNSON.